(No Model.) 2 Sheets—Sheet 2.

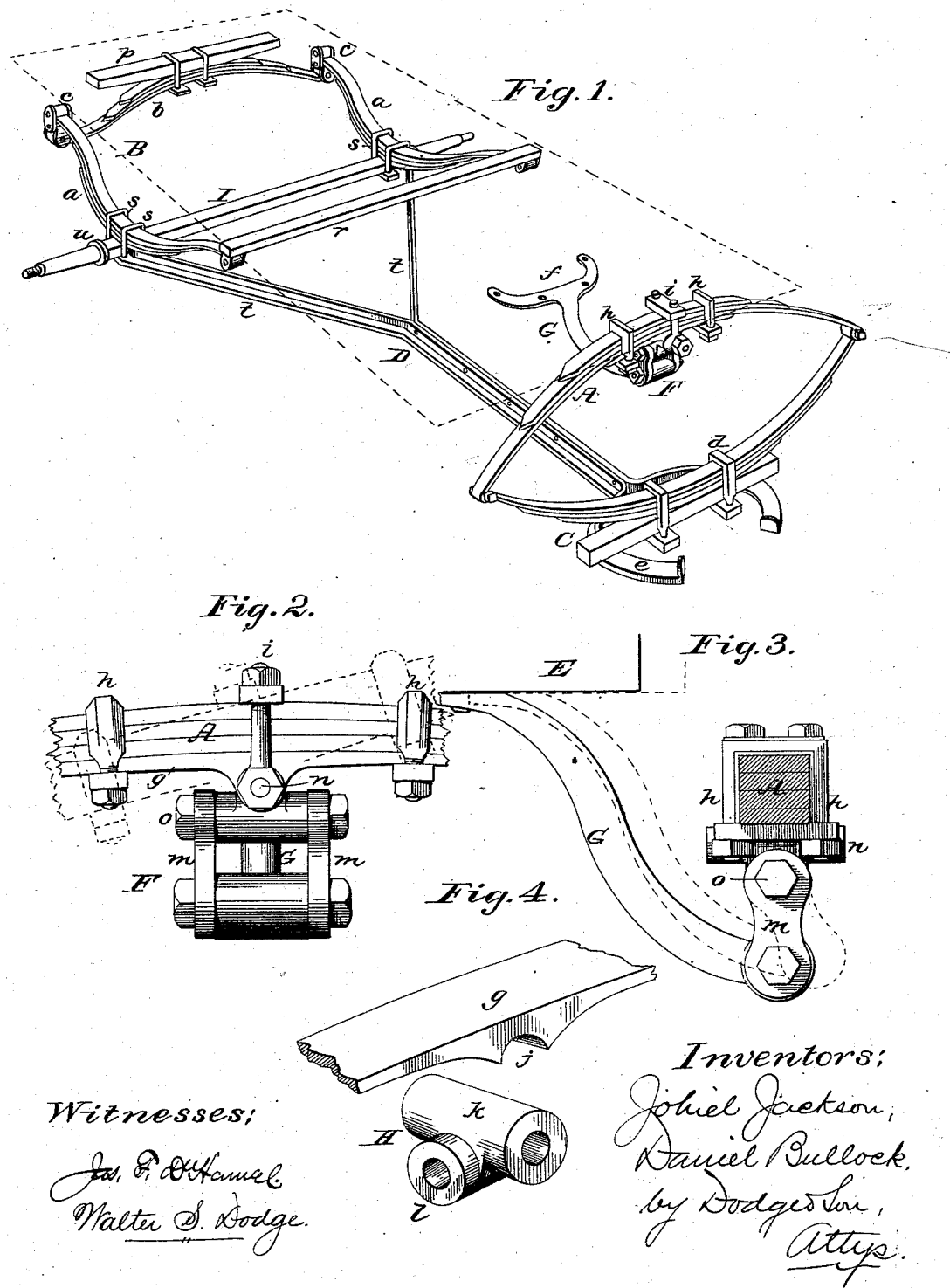

D. BULLOCK & J. JACKSON.
WAGON RUNNING GEAR.

No. 282,490. Patented Aug. 7, 1883.

Witnesses:
Jas. F. D'Hamel.
Walter S. Dodge

Inventors:
Johiel Jackson,
Daniel Bullock,
by Dodge & Son,
Attys.

UNITED STATES PATENT OFFICE.

DANIEL BULLOCK AND JOHIEL JACKSON, OF FORT ATKINSON, WISCONSIN, ASSIGNORS TO THE NORTH WESTERN MANUFACTURING COMPANY, OF SAME PLACE.

WAGON RUNNING-GEAR.

SPECIFICATION forming part of Letters Patent No. 282,490, dated August 7, 1883.

Application filed April 25, 1883. (No model.)

*To all whom it may concern:*

Be it known that we, DANIEL BULLOCK and JOHIEL JACKSON, of Fort Atkinson, in the county of Jefferson and State of Wisconsin, have invented certain Improvements in Running-Gear, of which the following is a specification.

This invention relates to that class of vehicles known to the trade as "half-platform" or "combination" wagons, employing platform-springs at the rear and an elliptic spring at the front.

The invention consists in a novel manner of mounting the wagon-body, whereby it is permitted to move longitudinally without straining the springs when the platform-springs or the side springs thereof are depressed, and when a perch or reach is used; and it further consists in a novel manner of constructing such reach of L-shaped angle-iron or steel.

Figure 5:
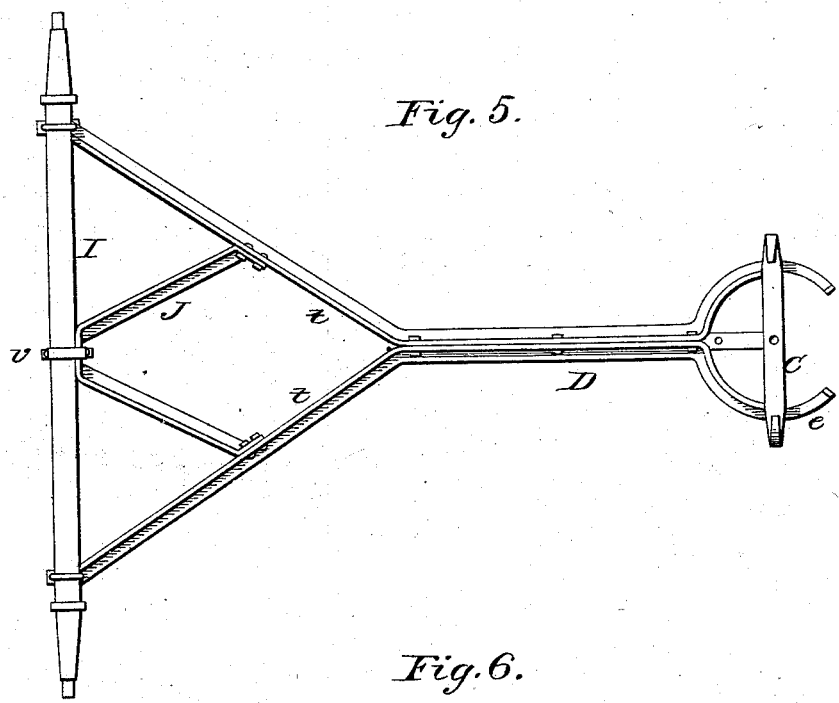
Figure 6:
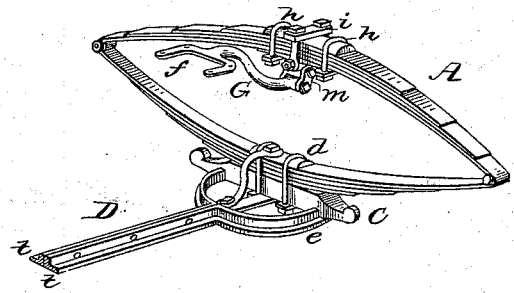

In the accompanying drawings, Figure 1 represents a perspective view of the springs and reach complete; Figs. 2, 3, and 4, enlarged detail views of parts shown separately; Fig. 5, a plan view of the improved reach; Fig. 6, a perspective view, showing the front spring, the hanger by which the body is connected therewith, and the forward end of the reach, which is fashioned to form the upper half of the turn-table or fifth-wheel.

In this class of vehicles it is customary to dispense entirely with the reach or perch, the connection between the front and back axles being through the body or box of the vehicle solely, and the load being hauled by tongue or shafts, drawing from the body and forward spring. This common plan is objectionable, because it brings undue strain upon the springs, and because under such strain, and with rough usage, the wheels get out of track. In attempting, however, to overcome the objections to the usual plan of construction by employing a reach another difficulty is met with, which is that the side springs of the platform-spring being rigidly secured to the rear axle, and the two axles held firmly at a given distance apart, the said side springs, in lengthening out under a load, push or force the body forward, thereby straining the front spring and the rear semi-elliptic spring of the platform-springs. To overcome this difficulty the forward end of the body is carried by a hanger or arm, which is suspended from a link or coupling attached to the under side of the upper section of the forward elliptic spring, said coupling permitting a movement forward and backward independent of the spring, and also a lateral rocking or tipping motion, to prevent twisting or straining of the coupling or the spring in passing over rough and uneven places, which cause the wheel at one end of the axle to rise higher than its companion at the opposite end.

Referring again to the drawings, the construction and arrangement of parts will be explained.

A represents the forward elliptic spring, which sustains the front end of the wagon-box or body, and B the rear platform-spring, consisting of side springs, $a\ a$, and semi-elliptic rear spring, $b$, connected by the usual links or couplings, $c$, as shown in Fig. 1. The front spring, A, rests upon and is firmly secured by clips $d$ to a head-block, C, which rests upon and is made fast to the upper half, $e$, of the fifth-wheel or turn-table, which in the present instance is formed as an integral part of the reach or perch D, as hereinafter more fully explained.

F represents a coupling forming a connection between spring A and hanger G, which latter is secured to the under side of the box or body E and carries the entire weight of the forward end thereof, said hanger being formed with a wide or extended bearing-plate, $f$, in order that it may be securely bolted to the box or body, and firmly held against wrenching or twisting, to which it will unavoidably be subjected. The hanger should also be made very strong, to guard against the possibility of breakage.

The coupling consists, first, of a plate, $g$, secured by clips $h\ h$ and $i$ to the under side of the upper section or half of the spring A, and formed with a semicircular seat or groove, $j$, to receive the rounded barrel $k$ of a block, H, having a second barrel, $l$, below and at right angles to the first; and, finally, two links, $m\ m$, connecting the block H with the forward end of the hanger G. The barrels $k\, l$ of block H are both perforated longitudinally and centrally to receive bolts $n$ and $o$, the first serving to connect the block to the plate $g$, and at the same time acting as a pivot for the block and as a fastening for clip $i$, and the second constituting the connection between the barrel $l$ of block H and the links $m\, m$, as shown in Figs. 1 and 2. The block H is thus free to rock or turn laterally, or in the direction of the length of spring A, and the links $m\, m$ are free to swing in a direction at right angles thereto, thereby producing in effect a universal joint, permitting the hanger G to move forward or backward, and to tip from side to side without twisting, straining, or moving the spring out of place.

The platform-spring B is arranged in the usual manner—that is to say, the semi-elliptic spring $b$ is furnished with a bolster or block, $p$, upon which the wagon-box or body rests, said spring being connected to the side springs, $a$, of the platform-spring by links or couplings $c$, which permit the lengthening of said side springs, which latter are attached at their forward ends to a cross-bar, $r$, which is firmly bolted to the under side of the box or body, as usual. The side springs, $a$, of the platform-spring B rest upon and are firmly secured to the rear axle, I, by means of clips or fastenings $s$, which also serve to hold or fasten the separated ends of the reach or perch D, which, as already shown, connects the front and rear springs, and holds them at a fixed distance apart.

From the foregoing it will be seen that when the springs $a$ lengthen out under the weight of a load, instead of forcing the spring $b$ backward and the spring A forward, the play will be taken up by the coupling F, which will act freely and with certainty regardless of the rocking or tipping of the body or the unequal elevation of the wheels on opposite sides, the reach serving, as in other vehicles, to maintain a fixed relation between the front and rear axles and their wheels, and serving to greatly stiffen and strengthen the vehicle as compared with the construction in which the reach is omitted.

The construction of the reach will be seen in Figs. 1, 5, and 6, said construction being adopted with a view to overcoming the objections commonly made thereto on the ground of unsightly appearance and weight. D indicates the reach as a whole, consisting, essentially, of two bars of L-shaped angle-iron or steel united through a portion of their length along their vertical flanges, which are laid flat together, as shown. Bolts, rivets, or other fastenings may be employed to unite the webs or flanges; or clips may be passed around them. The two strips $t\, t$ are separated at the forward end of the reach, and curved to form segments of a circle, which together constitute from two-thirds to three-quarters of a circle, or may complete the same, forming the upper half or part $e$ of the fifth-wheel or turn-table. The vertical flanges or webs of these curved portions are cut away to make room and afford a flat seat for the head-block C, and preferably cut away in front of said block to give a lighter, neater, and more usual appearance. From a point at or about the mid-length of the reach the strips $t\, t$ again separate and diverge, as shown in Figs. 1 and 5, extending to points on the rear axle just inside of the collars $u$ of the hub-spindles, at which points they are firmly secured to the axle by the clips $s\, s$, which, as above mentioned, also secure the springs $a$ to the axle. The upright flanges of the strips $t\, t$ are also cut away where the strips pass under the axle, thus forming shoulders against which the axle rests, and by which its position is more certainly determined, the flat portion of the strips passing beneath the axle, constituting clip-plates, as will be readily seen. Where greater strength and stiffness are required, a brace, J, may be added, said brace being formed also of the angle-iron, doubled at its middle, secured by a clip, $v$, to the axle, and bolted at its ends to the strips $t\, t$, as shown clearly in Fig. 5. This construction of the perch permits the same to be made very light and ornamental in appearance, and at the same time insures great strength and stiffness.

We are aware that both T and L shaped angle-irons have heretofore been used in the construction of running-gear of vehicles and for many like purposes, such forms of metal being common and well known to all branches of the iron-working trade, and involving, of course, no invention in their adoption and use, except in so far as there may be new adaptation, construction, and arrangement in their employment. We do not therefore claim, broadly, the employment of angle-iron or steel in the construction of running-gear, but confine our claims thereon to the manner of constructing the parts.

By the foregoing arrangement of body and springs the front spring is fully protected from the bad effects of end motion, or lurching forward and backward by sudden starting, stopping, or passing over obstructions, which is not the case where the forward ends of the side springs are hung in loops and the forward end of the body secured to the front elliptic spring, in the usual manner. In this latter case the body has no rigid or positive attachment to the rear springs, and its constant oscillations backward and forward, when in motion, over uneven ground and under a load, soon wear the joints of the elliptic springs loose, or loosen the fastenings of the springs at the top and bottom; springs of this form being especially weak in resisting the lurching forward and backward of the body.

Having thus described our invention, what we claim is—

1. The herein-described spring-gear for vehicles, consisting of springs A B, the latter arranged lengthwise of the body, coupling F, reach D, and body E, all constructed and arranged to operate substantially as set forth.

2. In combination with a vehicle box or body, a spring at the forward end of the box, connected therewith by a universal joint or coupling, a spring or springs at the rear end thereof, arranged to be extended in the direction of the length of the box, and attached to the box, and a reach or bar connecting the front and rear springs, substantially as shown and described.

3. In a vehicle substantially such as shown and described, the combination of a box or body, a spring beneath its forward end, and a coupling connecting the body and spring, consisting of the plate $g$, block H, links $m\ m$, and hanger G, all constructed, combined, and arranged to operate substantially as set forth.

4. The herein-described reach, consisting of strips $t\ t$, united along their middle and bent at their forward ends into segmental form, to constitute the upper part of a turn-table, as set forth.

5. In a vehicle substantially such as shown, a reach consisting of two strips of L-shaped angle-iron, having their upright flanges or webs laid together and united for a part of their length, and their ends separated and attached to the rear axle and the forward head-block, substantially as shown.

6. In combination with axle I and head-block C, the reach D, consisting of L-shaped strips $t\ t$, separated, as shown, and having the vertical flanges cut away where they pass beneath the axle and head-block, as and for the purpose set forth.

7. The herein-described coupling, consisting of hanger G, block H, links $m\ m$, bolts $n$ $o$, plate $g$, and clip $i$, all constructed and arranged to operate substantially as set forth.

DANIEL BULLOCK.
JOHIEL JACKSON.

Witnesses:
L. B. CASWELL,
D. A. BULLOCK.